COMPACT PLAYER FOR MAGNETIC TAPE CARTRIDGES

Filed April 5, 1966 8 Sheets-Sheet 1

INVENTORS,
WILLIAM P. LEAR
SAMUEL H. AULD
BY Richard A. Marsen
ATTORNEY

INVENTORS,
WILLIAM P. LEAR
SAMUEL H. AULD
BY Richard A. Marsen
ATTORNEY

INVENTORS,
WILLIAM P. LEAR
SAMUEL H. AULD

BY Richard A. Marsen
ATTORNEY.

INVENTORS,
WILLIAM P. LEAR
SAMUEL H. AULD

BY Richard A. Marsen
ATTORNEY.

COMPACT PLAYER FOR MAGNETIC TAPE CARTRIDGES

Filed April 5, 1966 8 Sheets-Sheet 5

INVENTORS,
WILLIAM P. LEAR
SAMUEL H. AULD

BY Richard A. Marsen
ATTORNEY.

COMPACT PLAYER FOR MAGNETIC TAPE CARTRIDGES

Filed April 5, 1966 8 Sheets-Sheet 6

INVENTORS,
WILLIAM P. LEAR
SAMUEL H. AULD
BY Richard A. Marsen
ATTORNEY.

INVENTORS,
WILLIAM P. LEAR
SAMUEL H. AULD
BY
Richard A. Marsen
ATTORNEY

Nov. 18, 1969 W. P. LEAR ET AL 3,478,973

COMPACT PLAYER FOR MAGNETIC TAPE CARTRIDGES

Filed April 5, 1966 8 Sheets-Sheet 8

INVENTORS,
WILLIAM P. LEAR
SAMUEL H. AULD

BY Richard A. Marsen

ATTORNEY.

United States Patent Office 3,478,973
Patented Nov. 18, 1969

3,478,973
COMPACT PLAYER FOR MAGNETIC TAPE CARTRIDGES

William P. Lear, Wichita, Kans., and Samuel H. Auld, Newport Beach, Calif., assignors to Lear Jet Industries, Inc., Wichita, Kans., a corporation of Delaware Filed Apr. 5, 1966, Ser. No. 540,289
Int. Cl. B65h *17/48;* G11b *5/00, 25/06*
U.S. Cl. 242—55.19 3 Claims

ABSTRACT OF THE DISCLOSURE

The tape player contains a tunnel with side walls spaced apart little more than the cartridge width. A pair of rollers are vertically oriented in one tunnel wall and ride on the adjacent side wall of the cartridge. A detent member is biased into the tunnel, and coacts with its other side wall. The member snaps into a V-notch of the cartridge, and presses it laterally against the roller pair. One of the rollers is opposite the detent member. The resultant arrangement facilitates smooth entry of the cartridge and its close orientation for quality transcription even when in mobile use.

This invention relates to player systems for magnetic tape cartridges, and more particularly to improved players with simplicity of operation, effective multi-track reproduction of the tape records, and of compact, rugged construction.

The compact magnetic tape player hereof is readily combined with a radio tuner-detector unit into a module that fits behind the dashboard of an automobile. Tape or radio play mode is effected directly by the degree of cartridge insertion, in the manner set-forth in the patent application for "Combination Radio and Magnetic Cartridge Player" Ser. No. 392,212, filed Aug. 26, 1964, now Patent No. 3,400,227, and assigned to the assignee hereof. Such direct play control is effected simply without distraction during automobile driving, or by a small child in home use models.

An important feature of the present invention is a novel arrangement for smoothly receiving and firmly engaging the tape cartridge in the player, in stable play relation with the capstan. A pair of self-lubricating rollers is mounted on one side of the opening for the cartridge, and a spring biased detent roller is on the opposite side. Cartridge insertion is eased of friction by these rollers along its sides. Ready play engagement against the capstan is directly effected by the cartridge having a contained pinch roller, the tape being set therebetween. The cartridge contains a unique side notch that coacts with the detent roller. The cartridge is thereupon established in a "floating" state that maintains it properly aligned and engaged for quality precision reproduction of the tape. Engagement and disengagement of the cartridge is rendered smooth, in the manner set forth in the copending patent application for "Endless Tape Cartridge," Ser. No. 467,599, filed June 28, 1965, assigned to the same assignee.

A number of significant and novel improvements in the player hereof, result in simpler construction and operation of its component sections, and also contribute to the inherent compactness of its overall bulk. Thus, the track-shifting mechanism includes a short magnetic head support tilted by a step-cam, and is readily adjusted in elevation and azimuth for precise tracking of the multi-track tape records. The drive motor is an inside-out arrangement, its outer shell being the rotor with a shaft as capstan for direct drive of the tape. The rotor is proportioned as a flywheel for smooth tape transport. The rotor is the only continually moving part in the player, eliminating the need for and space taken by belts, pulleys, gears and a separate flywheel.

The motor shaft extends to end bearings set in the base and cover of the player, and thereby permits a minimum vertical dimension therefor. The steady wear of belted tape drives is avoided, resulting in less service need and better quality of sound reproduction. Materially less wow and flutter are encountered in the player hereof than heretofore possible in mobile systems. Placing the pinch roller within the cartridge avoids the considerable vertical dimension requisite for chassis mounted swing-in type. Using transistors for the radio, motor control circuit, and stereo audio amplifiers in conjunction with the compact mechanical features hereof permits the construction of a combination radio-player unit that fits into the dashboard radio chassis module of current automobiles.

The above and further features, advantages and objects of this invention will become more apparent from the following description of an exemplary embodiment thereof, illustrated in the drawings, in which.

Figure 1:
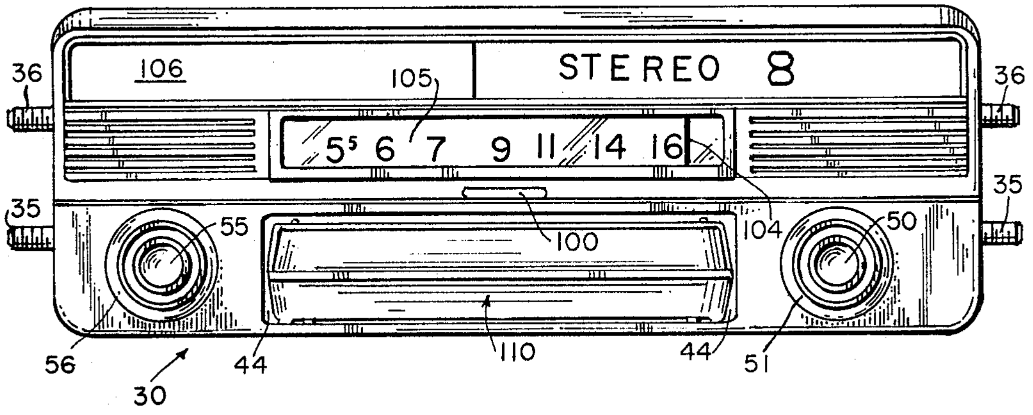
FIG. 1 is a front face view of the exemplary player, with a magnetic tape cartridge inserted therein.

The housing of the player 30 is composed of two half sections 31, 32 that are fastened together by machine screws or bolts at corner apertures 33, 33. The corner aperture regions are indented for this purpose, as shown at 34, 34 in FIG. 25. The sections 30, 31 are preferably rugged castings to afford suitable rigidity and reference platforms for stably supporting the player motor and mechanism in their precision transport and tracking of the magnetic tape 51 in a cartridge 50 inserted for play. The castings 31, 32 may be of aluminum or magnesium alloy to conserve weight. The pairs of threaded studs 35, 36 extend centrally out of the sides of the player sections 31, 32. The study sets 35, 36 are for securing the assembled player 30 onto a bracket 37, for adjustably mounting it in play position in a vehicle.

Figure 25:
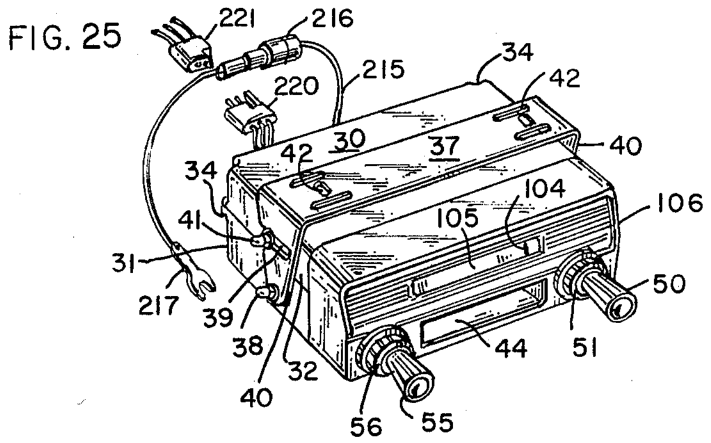
FIG. 25 is a perspective illustration of the exemplary player with a decorative front bezel and with a bracket for its underdashboard mounting.

FIG. 25 illustrates the under-the dashboard mounting mode in an automobile. Threaded caps 38 attach tip apertures of U-bracket 37 onto lower studs 35. The player is pivoted on the lower studs 35. The proper angle setting, with the upper studs 36 coacting in arcuate slotted regions 39 of the arms 40, 40 of bracket 37. The caps 41 on upper studs 36 are then fastened against the arms 40 and sides of player 30 to hold it in play position, as desired. For floor mounting in a car, boat or airplane the bracket 37 is positioned upside down with the upper studs 36 becoming the pivots and the lower ones 35 determining the angle in the slots 39. The plurality of slots 42, 42 in the body of bracket 37 are for securement thereof to the corresponding portion of the vehicle at which the assembly is mounted for use.

The magnetic tape cartridge 50 is inserted in a slot or tunnel 44 therefor, extending into the player from its front. A radio tuner-detector unit 45 is incorporated with the exemplary player 30. It is transistorized and fitted in a longitudinal compartment 46 at the right side of partition 47 in base 31. The radio tuning of unit 45 is performed through shaft 48 that extends to front or central tuning knob 50. Circuitry for the radio tuner-detector, for clarity, is not shown, nor are those for the stereo amplifiers and motor control; the present invention not being concerned as to their details.

Figure 3:
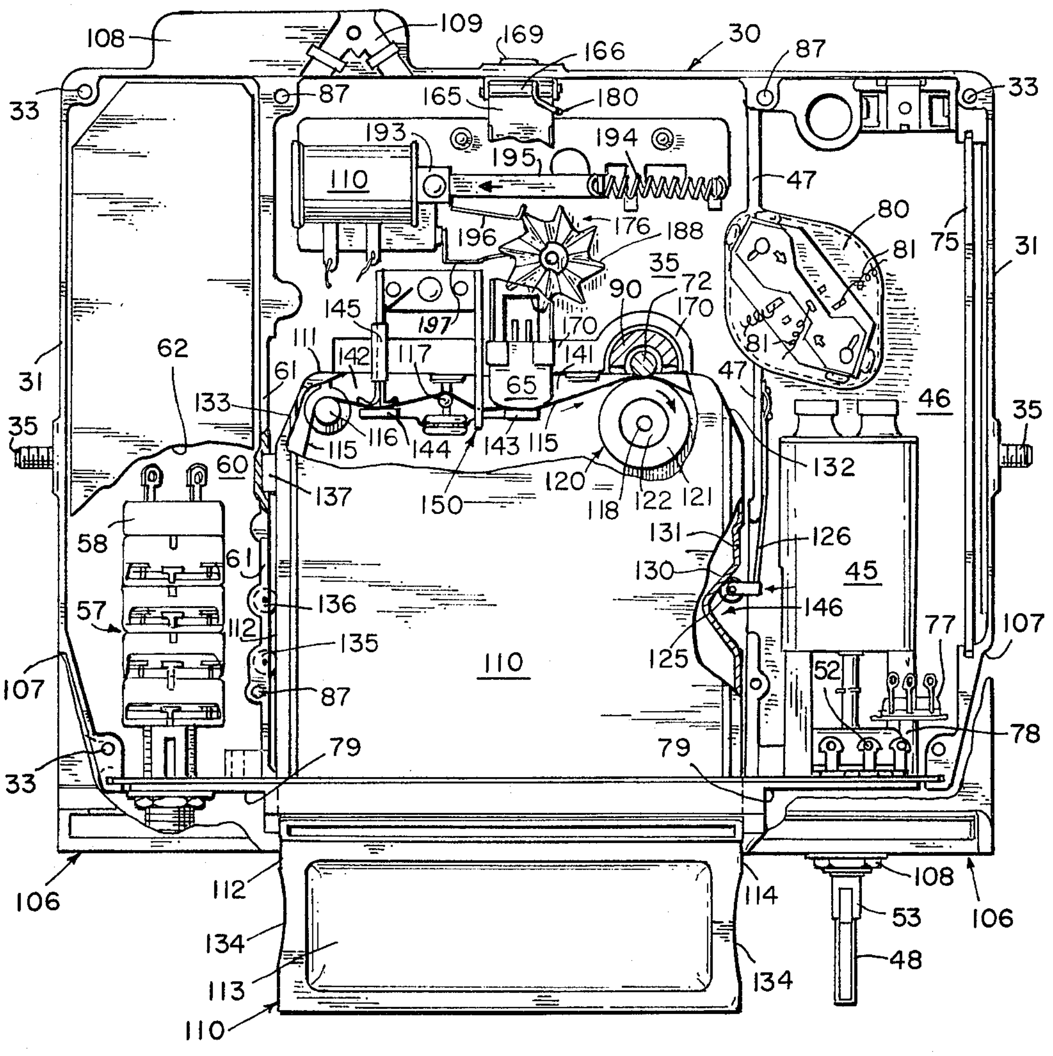
FIG. 3 is a plan view corresponding to FIG. 2 with the motor and other portions removed to show the interior mechanism and components, and their coaction with a cartridge inserted for tape play.

The balance control potentiometer 52 for stereophonic sound output control has a concentric sleeve 53 that is secured with the outer or back knob 51 (see FIGS. 3 and 25). Such knob array is of course optional. Clockwise rotation of knob 51 increases the right sound channel output while decreasing that on the left. Counterclockwise rotation will produce the opposite effect.

The set of control knobs 55, 56 at the left side are used herein as follows: The front or central knob 55 functions as the overall radio/player on-off switch, and volume setting. The outer or back knob 56 couples to a pair of potentiometers that effect tone control on both the stereo amplifier channels. This permits one to select the most pleasing tonal range for both the radio and tape playing. When it is turned clockwise the tone is more treble or brilliant. Turning knob 56 counterclockwise makes the tone more mellow and accentuates the bass tones.

A four-section potentiometer 57 (see FIG. 3) is used for the volume and tone control, in tandem for both stereo amplifiers. These are suitably ganged to the shaft and sleeve for control knobs 55, 56. At its rear section is the on-off electrical switch 58, above referred to. The exemplary dual stereo amplifier is a transistorized printed circuit array that is fitted within the longitudinal compartment 60 with ganged control 57, 58, at the left side of chassis base 31. Compartment 60 is defined by the left wall of base 31 and an interior wall 61 (see FIGS. 3 and 18). The compact stereo amplifier pair includes preamplification for the low-level magnetic head signal pickup of the tape record, and is diagrammatically indicated by its backboard 62 for simplicity of illustration. These amplifiers are shown schematically in circuital FIG. 24, at 63, 64. The dual magnetic (stereo) head is presented at 65, with individual tape channel pickup sections 66, 67.

Figure 24:
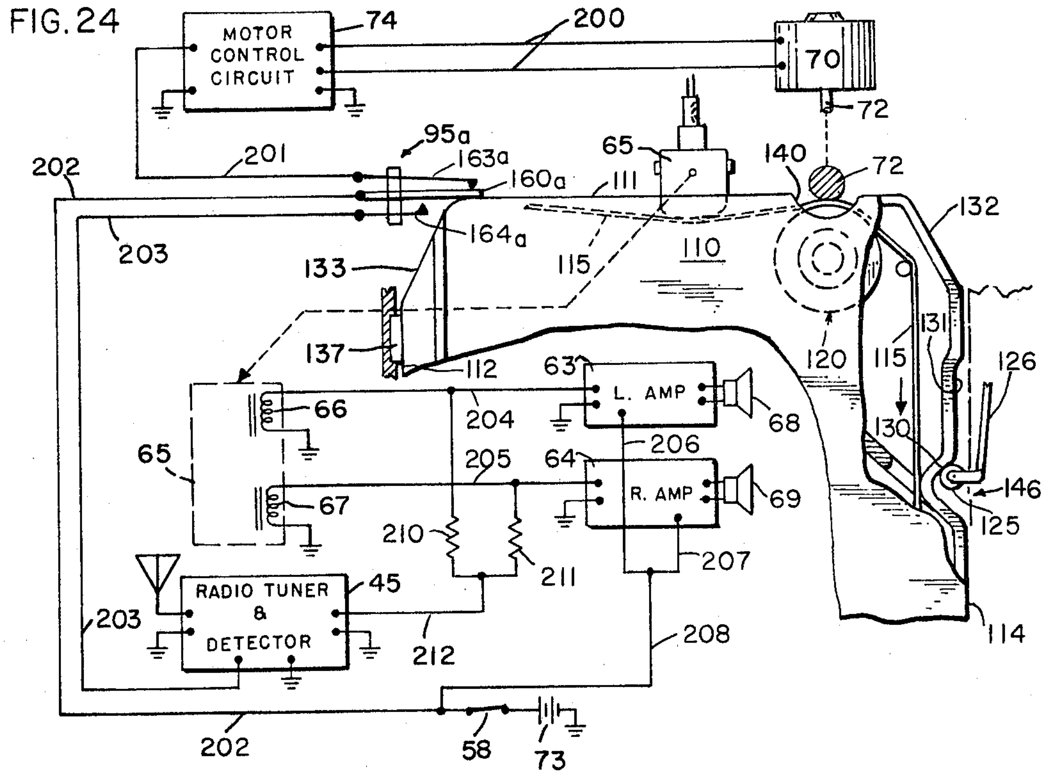
FIG. 24 is the overall schematic and block circuit diagram of the exemplary radio/tape player system.

The exemplary tape drive motor 70 is a low-voltage low-speed direct current permanent magnet type. Its rotor 71 is external and contains the predominate mass thereof to serve as a flywheel. Its central drive shaft 72 is the capstan for direct contact with and transport of the magnetic tape, see FIGS. 3, 18 and 19. The precise motor speed in r.p.m. is automatically controlled by an electronic motor control circuit energized by the vehicle low voltage source, as a twelve volt storage battery. The common battery 73 and speed control circuit 74 are indicated in FIG. 24. Further description of the exemplary motor 70 is presented hereinafter in connection with FIGS. 18 and 19.

Details of a direct current motor (as 70) are described in the copending patent application "Electric Motor Construction," Ser. No. 503,063, filed Oct. 23, 1965, now Patent No. 3,364,369. A suitable practical motor control system (as 74) is set forth in the copending patent application "Electronic Motor Speed Control," Ser. No. 490,551, filed Sept. 27, 1965, now Patent No. 3,396,323. It is to be understood that other drive systems may be used in the basic player hereof, as for example an alternating current motor with a separate flywheel, as for home-use models with an available 60 cycle source.

Most of the motor control circuit (74) is readily assembled on a compact printed-circuit-board, indicated at 75 (FIG. 3). Such board is held vertically along the right side of the player, by insertion in slots 76, 76 provided in base 31. A small potentiometer 77 has a forward projecting shaft 78 accessible through a small aperture in the front panel 79 for adjusting the speed of motor 70. The sizeable power transistor that directly controls the current through the motor in circuit 74, is mounted in a well 80 formed in the bottom of base 31 into the region 46, as seen in FIG. 3. This transistor (not shown) is mounted on the outside of base 31 for better ventilation, and suitably secured against the metal surface of well 80 that serves as a heat sink for circuital stability. Leads 81, 81 extend from the control transistor terminals into compartment 46 for connection in circuit 74.

The motor control circuit 74 regulates the motor speed to the predetermined r.p.m. for transporting the magnetic tape longitudinally passed head 65, e.g. at 3.75 inches per second. Such motor speed is normally held substantially uniform over wide variation in ambient temperature or available battery voltage. Should the motor speed somehow be off noticeably, a stroboscopic pattern premarked on its flat top can directly ascertain this. Slight adjustment of the potentiometer 77, performed simply from the player front, is generally sufficient to synchronize the motor pattern, and its speed.

A central sub-chassis 85, as a stiff steel plate, is secured to base 31 by self-tapping screws 86, 86 into apertures 87, 87. Plate 85 mounts the stator 88 of motor 70 with screws 89, 89, see FIGS. 18 and 19. A sleeve 90 is secured to the center of rotor 88 and extends to a "Teflon" pad 91 in a well 92 formed just below the level of base 31. A cut-out 93 in sleeve 90 provides access for the tape to the surface-roughened capstan thereat.

The motor 70 as a whole, including sleeve 90 and shaft 72, is thus mounted as a simple sub-assembly with a chassis plate 85. Its placement in the player is direct, sleeve 90 fitted into well 92 and the four screws 86, 86 securing plate 85 in proper position on base 31. This reduces production cost and service time. Its simplicity of parts and placement reduces cost and improves quality of the reproduced sound, with minimum wow and flutter and minimum wear and tear.

Circuit components are readily fitted on chassis plate 85. However, the vertically low motor 70, of relatively high diameter, takes up the predominate portion of the volume available above plate 85 and a large part of the space over compartment 46. The low-and-wide cylindrical configuration of rotor 71 enhances its rotational moment of inertia for a given power rating for the motor 70 and weight.

These inertia factors hereof provide excellent stabilizing flywheel action requisite for high quality sound reproduction of the tape records. he motor drive and flywheel action and capstan operation at precise rotational speed, are all provided by a single flat moving part, namely rotor 71 with its central shaft 72. Ultimate compactness in volume with minimum player height are thereby provided by the present invention. Further details of the simplicity of the exemplary motor mounting in the player, directly between base and cover 31, 32, are described hereinafter in connection with FIGS. 18 and 19. Such compactness is important for players that are to fit behind shallow dashboards, or in other confined locations.

Figure 2:
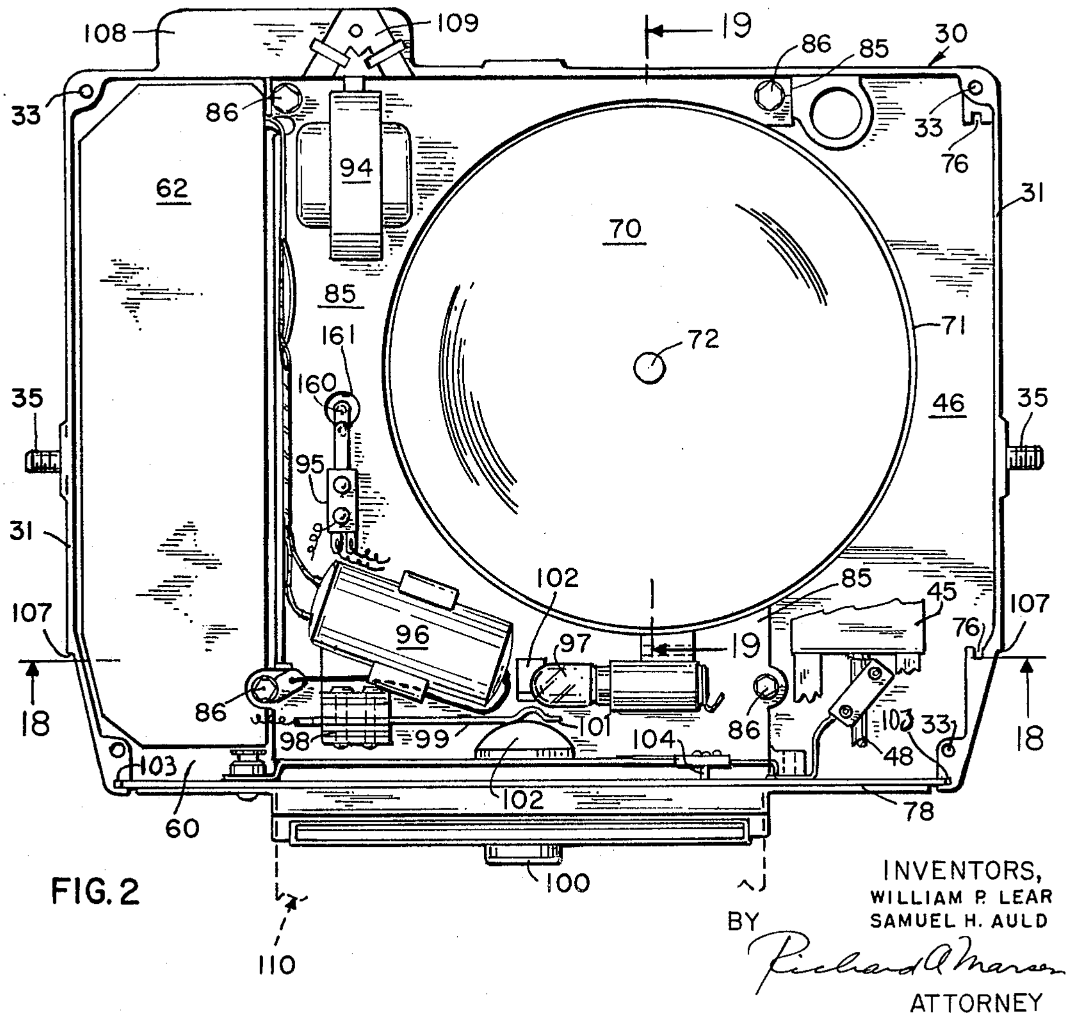
FIG. 2 is a plan view of the lower player section, with the upper section removed; the wiring being omitted for clarity.

Motor plate 85 carries thereon circuit transformer 94, cartridge operated radio/tape play-mode switch 95, electrolytic condenser 96, pilot light 97, and program or tape-track selector switch 98. The function and operation of play-mode select switch 95 is set forth hereinafter in connection with FIG. 3A. The program-select switch 98 comprises a leaf spring 99 that coacts with a push-button 100 slidably mounted centrally in front panel 78. The tip 101 of leaf spring 99 is arranged to normally press against the rear 102 of button 100, (FIG. 2). When the button is pressed inwardly, manually, tip 101 is displaced to contact grounded lug 102. A circuit is thereupon completed that energizes solenoid 110, to in turn effect the shifting of pick-up head 65 to the next stereo track pair or program position on the tape record.

The front panel 78 is a self contained sub-assembly that is inserted in vertical slots at the front corners 103, 103 of base 31, and companion ones in cover 32. When a radio tuner (45) is included in the player, a radio dial 105 is used. A movable pointer 104 is mechanically coupled to radio tuning shaft (48) controlled by knob 50 (not shown). Dial 105 is linear, parallel to cartridge tunnel 44, and placed above the tape cartridge position in the player. In this way one can view the radio tuning operation while a cartridge remains in player 30 in the "radio-play" position to be described.

A decorative front-cover or bezel 106 is readily combined with the player hereof. Its purpose is to enhance the appearance of the player, or permit ready change of design as viewed from the front. Bezel 106 may be inexpensively molded of tough plastic material, and coated with a metallic film to constitute a shiny player front. It is made to harmonize with the knobs.

Openings are provided to expose radio dial 105 and cartridge tunnel 44. An opening is also provided for the program select button (100) to project through, and an aperture for access to the motor speed control shaft (78). The bezel is hollow and proportioned to fit against vertical recesses 107, 107 in the side walls of base 31 and cover 32. The player sides are toed-in or tapered from recesses 107, 107. Bezel 106 is mounted against the player front by its having holes that fit over the front control shafts and sleeves when the knobs 50, 51 and 55, 56 are removed. The control shaft lock-nuts, or the knobs themselves, are positioned against bezel 106, holding it in position on the player at grooves or recesses 107, 107.

The exemplary cartridge 110 contains a reel of magnetic tape 115 therein, in endless array. A loop of the tape extends adjacent the forward end 111 thereof: about corner guide post 116, intermediate guide post 117, and pinch roller 120. The pinch roller hereof is rotatably supported on a fixed stud or post 118 of the cartridge housing, and contains a tire 121 of suitable elastic material as silicone, rubber or the like, concentric on its hub 122. More detailed description of cartridges similar to the one (110) hereof are set forth in the copending patent applications Ser. No. 467,599 referred to hereinabove and Ser. No. 494,645 for "Magnetic Tape Cartridge System," filed Oct. 11, 1965, and now Patent No. 3,403,868, assigned to the same assignee.

Tape cartridge 110 is inserted into player 30 at frontal slot or tunnel 44. FIG. 3 illustrates the cartridge fully inserted and firmly and stably held in the tape-play position. A retention roller 125 is arranged at the right side of the tunnel, biased inwardly towards the cartridge position by leaf spring 126, as indicated by the adjacent arrow. Roller 125 is held firmly pressed against an inclined wall 130 in the side of cartridge 110. The angle and location of wall 130 is arranged to establish a force component that presses pinch roller 120 against capstan 72 as well as a force component pressing the opposite cartridge side 112 firmly against side rollers 135, 136 and projecting member 137.

Rollers 135, 136 are mounted on respective vertical axes in partition wall 61; member 137 being affixed with wall 61. The rollers 135, 136 are preferably of solid self-lubricating material as "Teflon," "nylon," "Delrin." They materially facilitate the insertion and removal of the cartridge from the close fitting tunnel 44, and coact to stably hold the cartridge in a "floating" condition for smooth tape play in conjunction with the engaged retention roller 125 on inclined wall 130.

Proper pressure is established and maintained between the pinch roller 120 and capstan 72 for even and firm longitudinal transport of the magnetic tape therebetween. The capstan 72 and pinch roller 120 automatically align and adjust for optimum operation therefor in the novel effective floating arrangement hereof. Irregularities among cartridges as to true "squareness" or warpage, tire (121) resiliency or wear, are directly resolved in efficient tape play. No unpredictable friction on the cartridge sides is encountered which otherwise could constrain it into unsatisfactory tape presented for play at head 65. Further details and advantages of the floating roller catridge support system hereof are set forth hereinafter in connection with FIGS. 20 to 24.

When cartridge 110 is fully inserted in the play mode shown in FIG. 3, it is engaged with capstan 72 is hereinabove described. The capstan presses on the tape 115 as exposed through a front opening 140 at pinch roller 120 (see FIGS. 20 and 21). A further opening 141 admits pick-up head 65 to coact with the transported tape 115. A pressure pad 143 maintains the tape against the surface of head 65. A tape guide 150 mounted in the player adjacent head 65 is arranged to hold the tape firmly in a predetermined plane for head 65, and at a set level for precise tracking. Details of the exemplary tape guide 150 and its operation herein are set forth hereinafter in connection with FIGS. 15, 16 and 16A.

Another opening 142 at the cartridge front permits the insertion of sensing contactor 145 to establish continuous contact with the passing tape 115. Pressure pad 144 facilitates this. Two individual curved contact arms detect the passage of a conductive strip adhered to the endless tape at its record end/start position. A circuit is thereby closed to energize solenoid 110 and initiate the shift of head 65 to the next successive track playing position on tape 115 in the manner to be described hereinafter in connection with FIGS. 4 through 12.

Figure 3A:
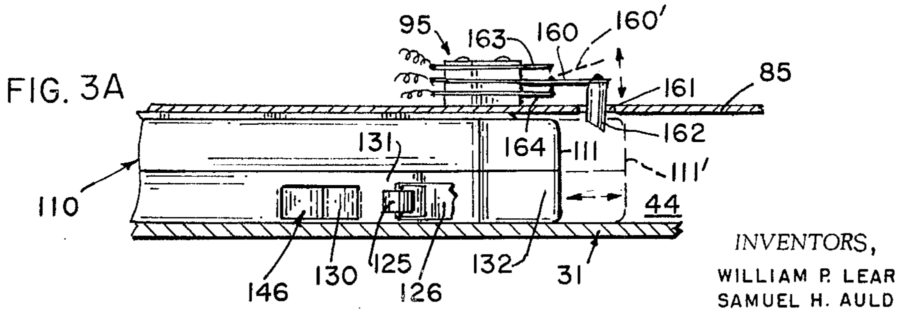
FIG. 3A is a diagrammatic illustration of the cartridge operated tape/radio play switch arrangement herein.
Figure 4:
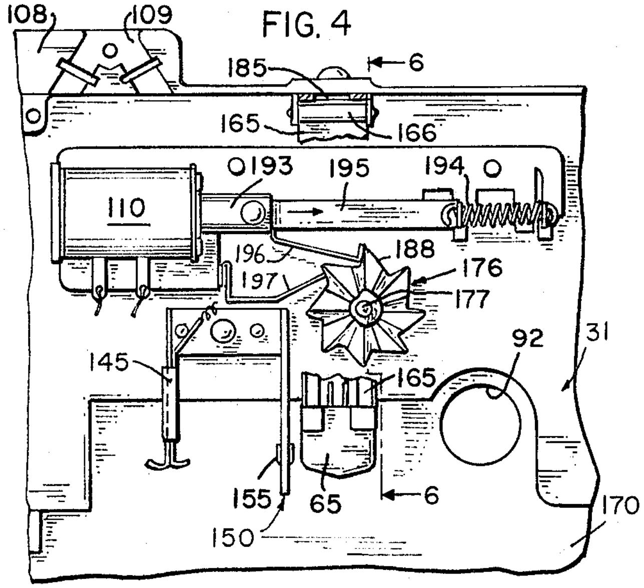
FIG. 4 is a plan view of the track shift mechanism upon completion of a shift actuation; partially broken away.

Upon the full insertion of the cartridge in the player, as shown in FIG. 3, the speed control circuit (74) for the drive motor (70) is directly activated to energize and operate the motor and its integral capstan (72). Towards this end, cartridge operated switch 95 is actuated, and the contained tape 115 is promptly transported for play by the capstan action. Switch 95, mounted above tunnel (44) on sub-chassis plate 85, has its central leaf-spring 160 extend over an aperture 161 in plate 85. A non-conducting pin 162 is fastened to the tip of leaf 160, and projects through the aperture into tunnel 44, as seen in FIG. 3A.

When cartridge 110 is fully seated, in forward abutment with capstan 72, its front end (111) is at the dashed line position 111'. Pin 162, which preferably has a slanted face, is thereupon moved upwardly by the cartridge. This results in leaf-spring (160) connecting with upper contact 163, in dash-line position 160'. This corresponds to the illustrated connection of switch **95*a* in tape-play mode FIG. 24. As set forth hereinafter, the motor control circuit (74) and motor (70) remain energized and operative-for-play while the play mode switch is thus closed by the tape-play position of the cartridge. It is of course understood that the master switch 58 is "on" through operation of knob 55 for either tape or radio to "play" under the control of cartridge actuated switch 95 (or 95*a***).

When it is desired to change to radio-play the cartridge is withdrawn from the full-in tape-play mode by say ⅜" or ½". This action frees switch pin 162, which thereupon permits leaf-spring 160 to return to its normally closed position on lower contact 164. The contacts 160–163 are thereupon opened, the motor control circuit (74) deenergized, and the motor (70) stopped. Closure of contacts 160–164 completes the circuit energizing radio tuner and detector unit (45) which in turn plays through the amplifiers 63, 64 and speakers 68, 69, as described hereinafter in connection with FIG. 24. In the radio-play position of cartridge 110 detent roller 125 may repose in the shallow depression or secondary notch 131, further up side 114 nearer to ramp 132, or the cartridge fully withdrawn. Such cartridge operated selective radio/tape play system corresponds to that first described in our aforementioned Patent No. 3,400,227.

Figures 15, 16, 16A, 17:
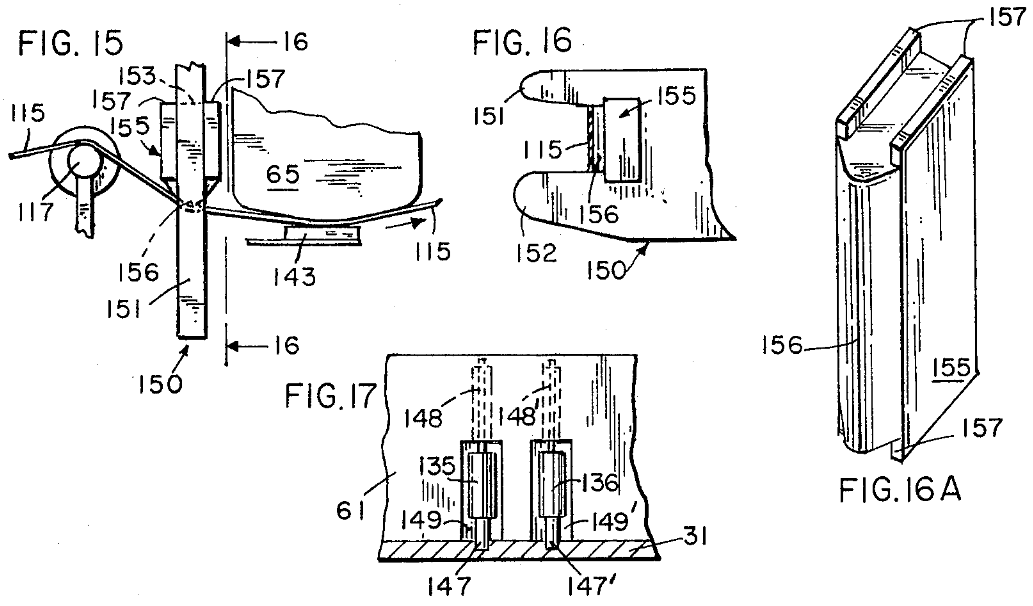
FIG. 15 is a plan view of the tape guide system hereof.
FIG. 16 being an elevational view thereof as seen along the line 16—16, and FIG. 16A a much enlarged perspective view of the insert used therein.
FIG. 17 is an enlarged elevational view of the side rollers in the player that facilitate coaction of the magnetic tape cartridge with the player.

It is to be noted that the rigidly constructed base section 31 serves as a platform for the inserted cartridge 110. The bottom or base of the cartridge lies flat on firm player section 31 as seen in FIG. 3A. Further, the tape guide 150 projects into the opening 141 at the front of the cartridge and accepts the linear passing tape 115 as seen in FIGS. 3, 15 and 16. The guide fingers 151, 152 project across the tape and maintain it parallel to the front surface of head 65 for precise tracking coaction therewith. Tape 115 closely fits between the inner surfaces of fingers 151, 152 and against guide member 155 as will be set forth in greater detail.

Figure 6:
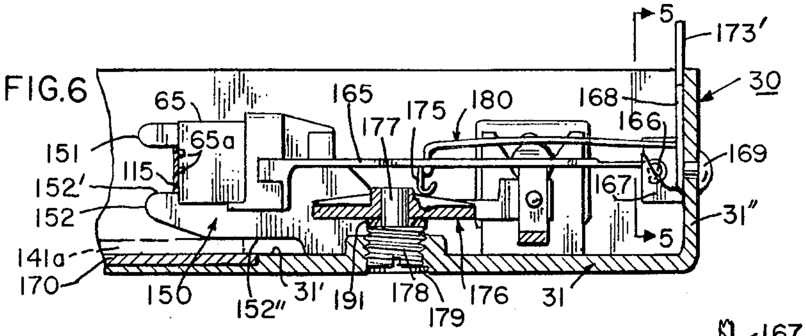
FIG. 6 is an enlarged side elevational view of the head support and track shift mechanism, as seen along the line 6—6 of FIG. 4 in the direction of the arrows.

Importantly, tape 115 is held substantially perpendicular to the base 31 and at a predetermined distance with respect thereto, for the duration of tape play. This is due to the tape's coaction in guide 150, and the preset distance maintained therefor between the tape surface 152' of finger 152 and the inner surface 31' of base 31, as best seen in FIG. 6. Further, for play stability despite significant warpage of the cartridge housing, lower lip **141*a* of the cartridge at front opening 141 is gripped by tape guide 150 at the undersurface 152'' of finger 152**. The thus firmly held cartridge and precisely fed tape thereof, in the player contributes to a minimum wow and flutter in playback by the system hereof.

The player hereof is very well adapted and constructed to play tape records containing eight parallel individual recorded sound tracks on one-quarter inch wide tape. Such tracks each are of the order of 0.020" wide and necessarily closely spaced to fit on such tape width. The head is supported for play by the track positioning and shifting mechanism hereof for repetitive precision tracking and reproducing of the magnetically recorded sound. The two pick-up regions **65*a* of head 65 are spaced apart for stereo play whereby track numbers 1 and 5, 2 and 6, 3 and 7, 4 and 8** are paired for this purpose.

The tape record end/start region is sensed by contactor 145 as aforesaid, to directly actuate the track shifting operation to maintain continuity of play among the successive track pairs. For monaural eight-track recording, each parallel track is scanned and played in succession, as in the manner effected automatically in the copending patent application "Selective Stereo-Monaural Player," Ser. No. 522,514, filed Jan. 24, 1966, and assigned to the same assignee. A cartridge 110 4.0" x 5.5" x ⅞" in overall dimensions can readily contain a 400 foot reel of conventional lubricated ¼" magnetic tape for this purpose. Played at 3.75" per second, this produces a stereo program one hour and twenty minutes long; and a monaural one, of two hours and forty minutes. Such endless tape cartridges may be constructed as described in the copending Patent No. 3,403,868 and application Ser. No. 467,599 referred to hereinabove.

The tape tracking and shift mechanism hereof is a simplified and more effective construction than shown and described for this purpose in our aforesaid copending patent application Ser. No. 392,213. Its function is to present pick-up head 65 at precisely the correct on-track orientation with respect to the prepositioned tape passage, and then to rapidly shift the head to the next successive track position in response to a shift signal. As already stated and as circuitally set forth in the just mentioned patent application, each time the program select button (100) is pressed, and/or each time the end/start conductive tape patch reaches contactor 145, solenoid 110 is energized for a short duration. Its armature is thereupon displaced to effect a predetermined lateral displacement of head 65 on the passing tape 115.

Figure 5:
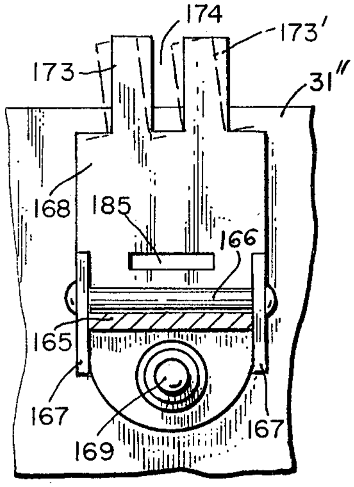
FIG. 5 is an enlarged elevational view of the angular adjustment section of the head support member, as seen along the line 5—5 of FIG. 6.

Head 65 is solidly attached to the end of a support beam 165. Support 165 is pivotally mounted to an upright edge 31'' of base 31 through pin 166 carried in the arms 167, 167 of a bracket 168. Bracket 168 is pivotally secured to the base section 31'' by a rivet 169. The angular orientation or azimuth of head 65 with respect to the path of the recorded tape tracks is thus readily and directly adjustable through angular positioning of bracket 168 firmly retained by rivet 169 against section 31''. Towards this end two spaced tongues 173, 173' extend from bracket 168 to above the level of lower chassis 31, as best seen in FIGS. 5 and 6. A flat tool inserted in the slot 174 between tongues 173, 173', as the end of a screwdriver is used for the azimuth adjustment. While factory set and stable, azimuth readjustment is indicated if there occurs a noticeable loss in the high frequency portion of the sound played back. Such adjustment is readily made herein while the player is in operation, with the top cover removed.

Head support 165 contains a depending leg 175 that is spring biased against the surface of step cam 176 and serves as a cam follower. In the exemplary system step cam 176 has four discrete levels, and coacts with follower 175 to angularly displace head 65 as will be described in more detail in connection with FIGS. 10, 11 and 12. Each cam level corresponds to the level of a track pair that is prerecorded on the tapes. Each successive cam step displaces follower 175 and head 65 accordingly for progressive playing of the tape records. The steps of cam 176 are in circular array and arranged to cyclically repeat their successive head shifting action.

Cam 176 has a central opening that mounts rotatably about a post 177 that extends up from base 31, see FIG. 6. Post 177 is an end part of a wider threaded member 178 that serves as a set-screw. Set-screw 178 is set in an internally threaded opening 179 in the bottom of base section 31. Its position in opening 179 determines the distance of cam 176 from base 31. Such adjustment is readily performed with precision. A screwdriver serves to turn set-screw 178 in or outwardly. The normal range of positions of set-screw 178 is preferably with its head fully within opening 179, so as not to project from base 31. Sealing wax applied as a thin layer over the set-screw from the outside affords advantageous stability to its setting, made externally.

Misadjustment of the height of head 65 above the reference level of the chassis base interior (31'), or with respect to the tape level as determined by the tape guide 150 as aforesaid, results in deterioration of the quality of sound reproduction and/or cross-talk. Slow turning of set-screw 178 raises or lowers cam follower 175 correspondingly, and in turn changes the elevation setting of the head in its angular shifting by bracket 165. Cross-talk is noticeable in stereo play when interference from other tracks occurs during pauses in the particular tracks in play. The invention adjustment arrangement hereof is inexpensive, simple, effective and stable.

It is important to maintain a firm steady pressure of cam follower 175 on step cam 176. In this way the tracking is maintained uniformly, despite bumpy riding in portable usage, or non-horizontal player orientation. A simple compound integral spring 180 is used to maintain a strong spring force or bias between cam follower 175 and cam 176.

Figure 7:
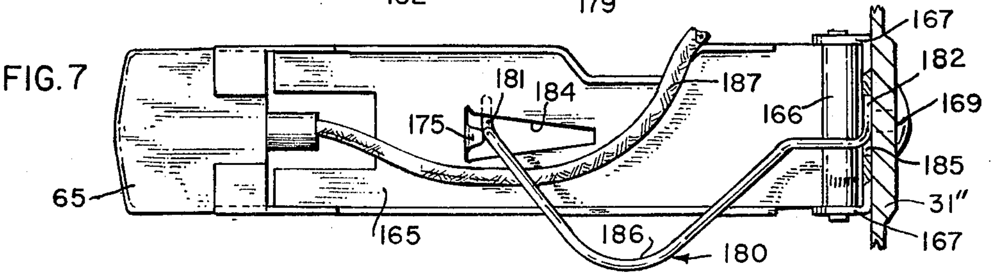
FIG. 7 is an enlarged plan view of the head support assembly.
Figure 8:
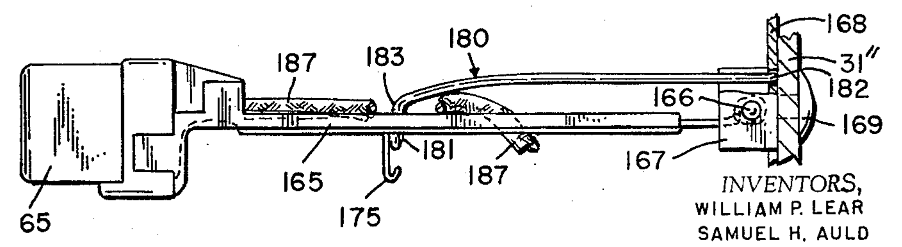
FIG. 8 is a side elevational view of the head support assembly of FIG. 7, partially broken away.
Figures 9, 9A:
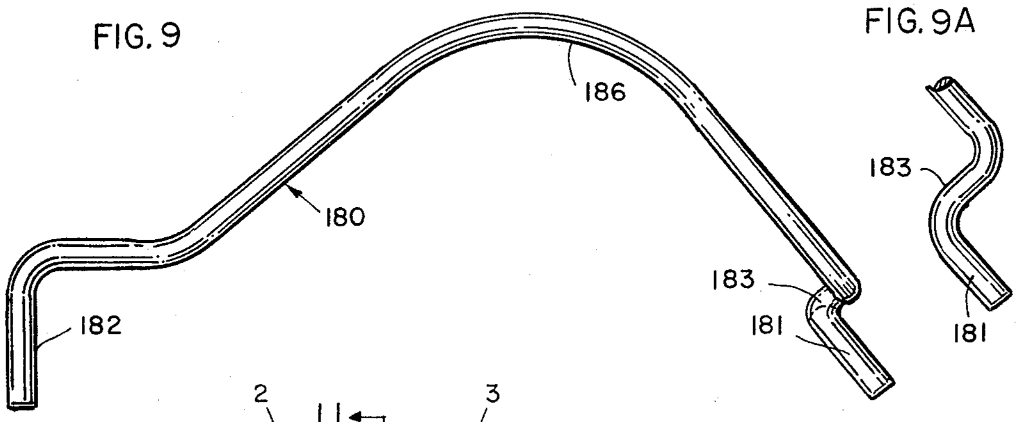
FIG. 9 is an enlarged plan view of the snap spring for the head support assembly.
FIG. 9A being a further view of a tip thereof.

Exemplary spring 180 is made of stainless steel wire, 0.054" in diameter. It extends about 1.5" between its ends 181, 182 when held in position, as shown in FIGS. 6, 7 and 8. Its lower end 181 is in the form of a hook 183 that engages in a slot 184 of support 165. Slot 184 is adjacent cam follower leg 175, and in fact is formed by punching out leg 175 thereat. The opposite spring end 182 is formed to be parallel to base section 31" and is latched into a matched rectangular groove or slot 185 in bracket 168. The central portion 186 of spring 180 is arcuate. FIGS. 9 and 9A are enlarged views of spring 180 in unmounted condition.

The far end 182 of spring 180 is above the level of head support 165, while end 181 is at the bracket level. The spring is bowed at its arcuate center 186, contracting it to readily and simply snap in between slots 184 and 185, see FIG. 7. Several important functions are accomplished thereby. Firstly, the requisite force component between the cam follower 175 and cam 176 is directly provided. Such force of the order of 75 grams is exemplary. Secondly, a longitudinal force component occurs on support 165, in the direction outwardly, away from its hinge 166, 167. The head support 165 is thereby held tautly, eliminating any looseness of fit or functioning. Thirdly, the shaping of spring 180 and its orientation serves to hold the leads or cable 187 from head 65 dressed properly on support 165. This saves some labor, material, as it is accomplished upon insertion of the spring.

Figure 10:
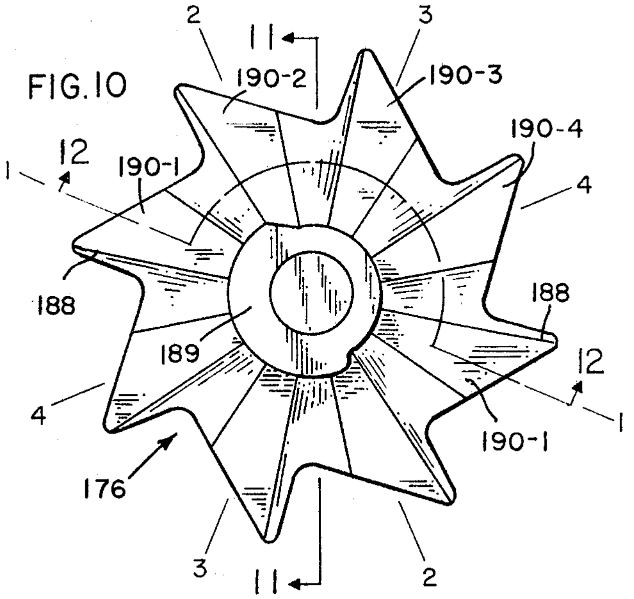
FIG. 10 is an enlarged plan view of the step cam of the track shift mechanism.
Figure 11:
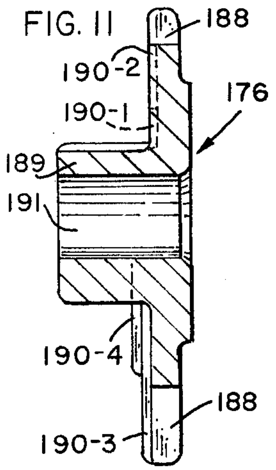
FIG. 11 is a cross-section taken through the cam of FIG. 10, along line 11—11 thereof.
Figure 12:
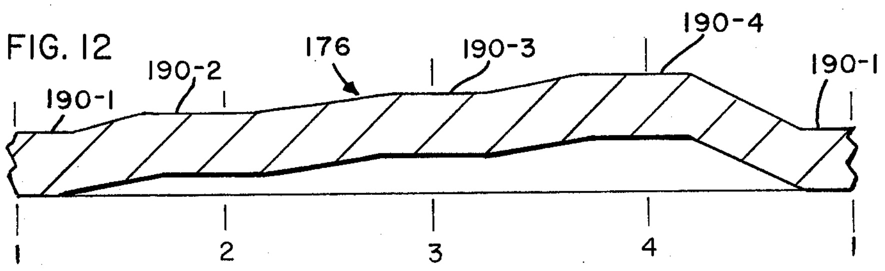
FIG. 12 is a diagram of the FIG. 10 cam as developed along the compound line 12—12 thereof.

Step cam 176 contains two cycles or sets of levels, each cycle being four discrete steps. Cam 176 contains integral peripheral ratchet teeth 188, 188, eight in number herein. Each cam shift or step thus subtends a 45° turn. FIGS. 10, 11 and 12 are enlarged informative views of step cam 176. The numerals 1, 2, 3, 4 refer to the respective sequential steps or levels of the cam as it is rotated in 45° increments, through two cycles per one revolution. As denoted in development FIG. 12, each step 190–1, 190–2, 190–3 and 190–4 is flat and parallel to the base under the cam, namely the bottom 31' of base section 31.

Cam 176 is fabricated of powdered iron, to precise dimensions. A central stereo-monaural cam 189 is molded integrally with step cam 176 for purposes set forth in the aforesaid patent application Ser. No. 522,514. Cam 176 has its central aperture 191 fit onto post 177, and a washer 192 as of "nylon" is placed between it and set-screw 178. Ratchet-cam 176 is actuated step-by-step, in 45° amounts upon each electrical energization of solenoid 110. Its plunger 193 is attached to return spring 194 by link arm 195. A trip spring 196 attached to plunger 193 engages ratchet teeth 188 in succession, to turn cam 176 one step clock-wise upon the return motion of the plunger 193. Pawl 197 and spring 196 serve to hold ratchet-cam 176 stably in its angular position between actuations, see FIG. 4.

Despite precise orientation of the head (65) through elevation and azimuth adjustments with respect to the tape record tracks, other mechanical factors may result in mistracking or cross-talk during playback. Such factors are mechanical inaccuracies in the chassis casting (31) or in tape guide (150) per se, poor capstan (72) vertically or parallelism with the pinch roller (120). Another important factor is found to be due to the angular displacement of the head (65) by its support (165) in the track shifting operation.

Figure 13:
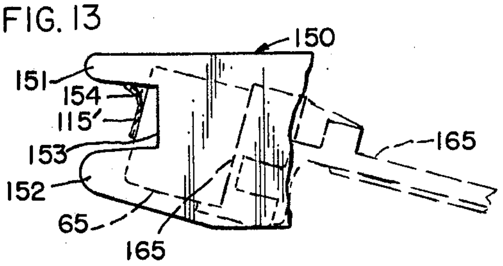
FIGS. 13 and 14 are diagrammatic prior art showings of a fault in magnetic tape handling that is overcome herein.
Figure 14:
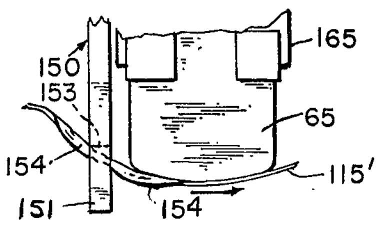
FIG. 14 PRIOR ART

The head is in effect pivoted at hinge 166, 167, and thus its tape face is angularly displaced with respect to the normal tape path. The result is shown in FIGS. 13 and 14, in exaggerated illustration. The path of tape 115' is nominally parallel to the inner surface 153 between fingers 151, 152. However, magnetic tape is a very thin material, with a base as of "Mylar"; is limber, limp, iwth no inherent stiffness. The tape is readily collapsed in the transverse direction. Actually, tape 115' in FIGS. 13, 14 is shown curled at its upper region 154. This often occurred in prior players due to the angular track shifting of head 65 as stated, or the other factors referred to to upset the tape from its normal play path. The limber tape (115') could rather readily move up or down from its nominal path, and ride across part of finger 151 or 152 as illustrated, with a curled end. Such tape displacement correspondingly shifted the preset tape track levels for the scanning, and thereby produced cross-talk.

A novel effective solution to this problem, that otherwise could be a serious impediment to quality stereophonic sound reproduction, is illustrated in FIGS. 15, 16, 16A. In principle, significant stiffening of the tape (115) is provided in proper orientation, at the tape guide (150) and close to the head (65). The tape stiffening is produced by imparting a marked radius to the tape in its movement towards the head. A smooth, tough member 155, preferably of self-lubricating material is mounted in the tape guide 150. Suitable material is "Delrin" or "Teflon." Member 155 contains a projection or nose 156 that is oriented parallel to the desired tape path and over which the tape (115) is arranged to pass in close contact.

The radius of the tip of nose 156 of exemplary member 155, as used for ¼" magnetic tape of limp base material a few thousandths of an inch thick, has been found very satisfactory at 0.010". This radius extends for its whole height, along the order of ¼" to match the tape height; its thickness being 0.060". It is noted that the position of member 155 is such as to direct the tape to wrap considerably about its nose 156 and thereby impart a marked radius on the tape that significantly stiffens it at that section.

The result is an almost magical elimination of cross-talk, whether due to angular scanning by head 65, or the irregularities referred to hereinabove. No curling or tape displacement can occur. The tape 115 maintains a strong and rigid plane unto its scanning coaction with the head (65). The exemplary member 155 is molded in the form of an insert for the tape guide (150). FIG. 16A is an enlarged perspective showing thereof. Two sets of ribs 157, 157 extend therefrom to grip onto respective fingers 151, 152. Its back surface merely abuts guide surface 153. Its depth, as 0.110", thus projects nose 156 beyond further into the cartridge opening and thereby effect the significant radius of curvature to the tape (115) that stiffens it thereat.

Figure 18:
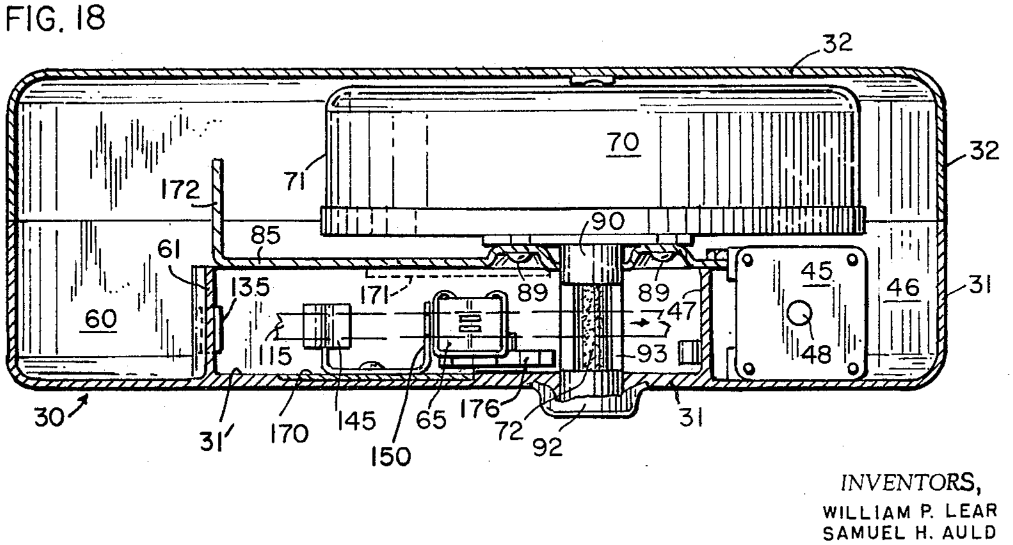
FIG. 18 is a cross-sectional view taken through the player along the line 18—18 of FIG. 2, showing the simplified motor-capstan arrangement thereof and its relation to the magnetic tape and associated player components.

Cross-sectional FIG. 18 shows the normal tape path (115) in elevation, across head 65, capstan 72, tape guide 150 and contactor 145, all operative at a predetermined distance from reference surface 31′ of base section 31. The pickup head (65) is a low signal level device, constructed with a shell that is an effective shield against surrounding magnetic and electric disturbances. Nevertheless it is advantageous to further shield against often strong extraneous radiations that emanate from automobile ignition systems and/or the motor (70) drive.

A plate 170 of magnetic shielding material, of "Permalloy," "Mu-metal" or the like, is set in a groove in base 31 under the tape handling and pickup section of the player, see FIG. 18. Another such plate 171 is fastened below sub-chassis 85 in the region above said sensitive pickup section. Also a wall 172 extends upwardly from metallic sub-chassis 85 in the vicinity of the high-gain stereo amplifiers that are placed in compartment 60. Ledge 172 and wall 61 shield compartment 60.

Figure 19:
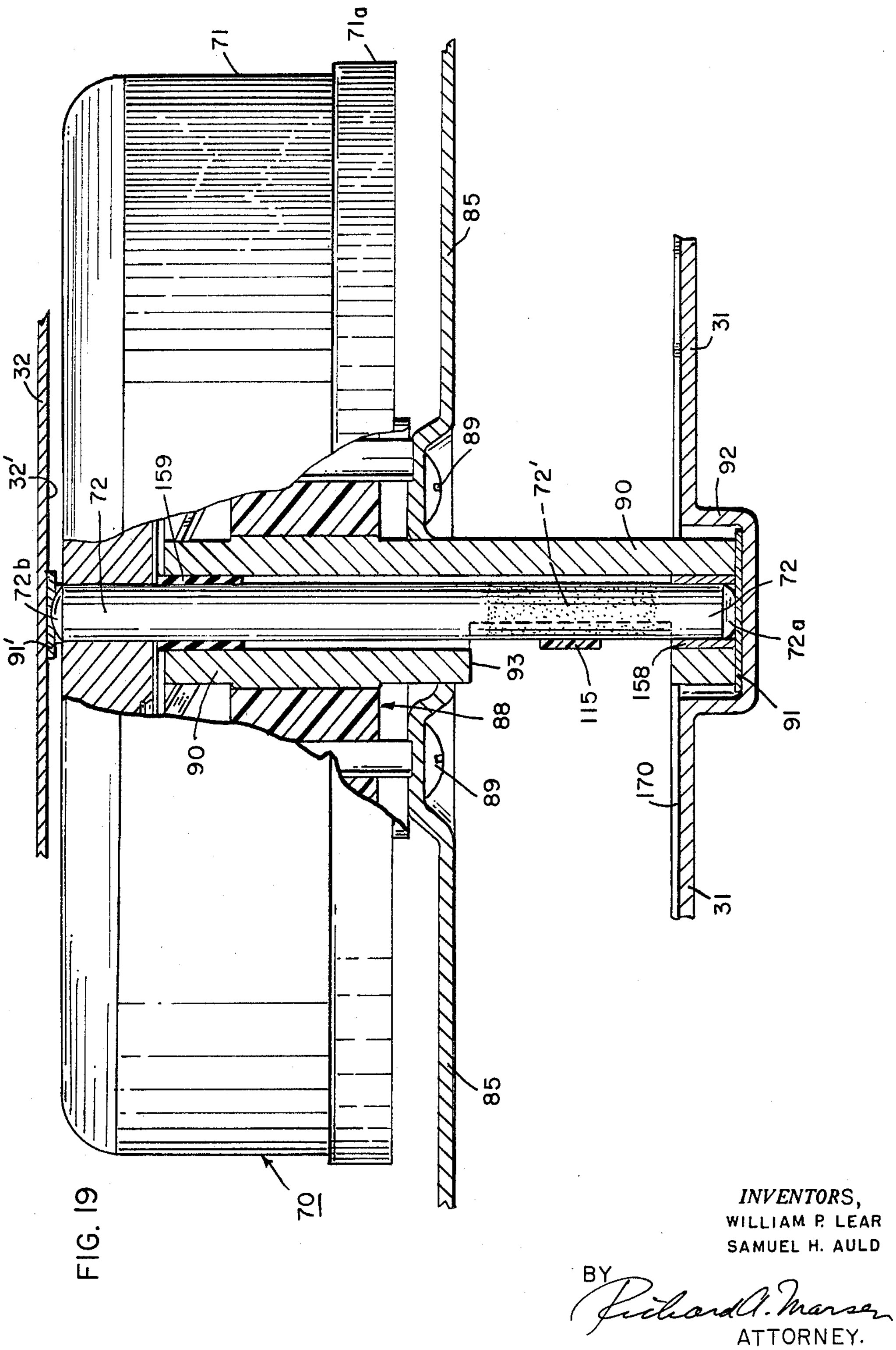
FIG. 19 is an enlarged elevational view of the drive motor-capstan, partly in cross-section, taken along the line 19—19 in FIG. 2, also showing its mounting arrangement arrangement in the player.

The drive motor 70 has its central armature 88, see FIG. 19, fastened to sub-chassis 85 by suitable screws 89, 89. Armature 88 contains peripheral permanent magnet sectors (not shown) that coact with the rotor 71 concentric thereabout. The rotor 71 is capped by a lid 71*a* that serves as a bottom shield. The stator 88 contains central sleeve 90 in which the motor capstan/shaft 72 mounts. Two sleeve bearings 158, 159 are used therein. Shaft 72 is secured with the rotor shell. In practice, the relatively light-weight stator-sleeve unit 88, 90 remains mounted in its position on sub-chassis 85.

During factory assembly or field service the sub-chassis (85) assembly is readily handled as a separate section of the player. Electrical connections to components thereon are either made long or with clip-in ends. It is inserted in position by simply placing the foot of sleeve 90 into well 92, when plate 85 is secured on base 31 by screws 86, 86 (FIG. 2) resulting in a solid precise bearing arrangement for the motor shaft (72). Details of the construction and operation of motor 70 are set forth in the copending Patent No. 3,364,369 referred to hereinabove.

The motor mounting is further stabilized by the provision of a thrust bearing surface in well 92 at pad 91, and importantly by a top pad 91′ also of self-lubricating material as "nylon" or "Teflon." Both the bottom and top ends 72*a*, 72*b* of motor shaft 72 are formed with a smooth rounded surface. The distance between the inside bottom surface of well 92 and the inside surface 32′ of cover section 32 is predetermined and rendered consistant and firm. This is due to the solid rigid construction of the player half-sections 31, 32 that are precisely fitted together.

The resilient pads 91, 91′, of proper thickness, are affixed in place on sections 31, 32 and constitute a simple, effective, inexpensive and unique rotary support for the rotor (71). Sleeve bearings 158, 159 and sleeve 90 serve primarily to align and hold shaft 72 in its intended vertical position; while preset resilient end bearings insure stable rotation thereat without axial displacement. Pad 91′ may desirably have its central portioned cupped to receive shaft end 72*b*, for further centering and alignment upon assembly.

The single-moving-part rotor/capstan (71, 72) concept herein is further enhanced by the extreme mechanical simplicity and stability of the tape drive assembly hereof. The exemplary compact player (30), with cover sections 31, 32 of substantial strength and thickness, a rotor (71) of substantial weight for significant flywheel action, and all the electronic circuitry weighs the order of only nine pounds.

Figure 20:
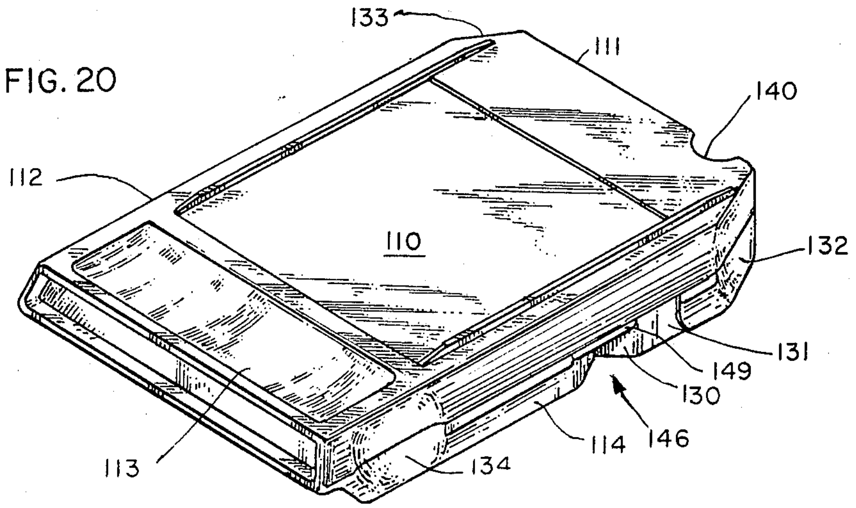
FIG. 20 is an external perspective view of the exemplary magnetic tape cartridge hereof, with the exposed tape end out of view, towards the rear.
Figure 21:
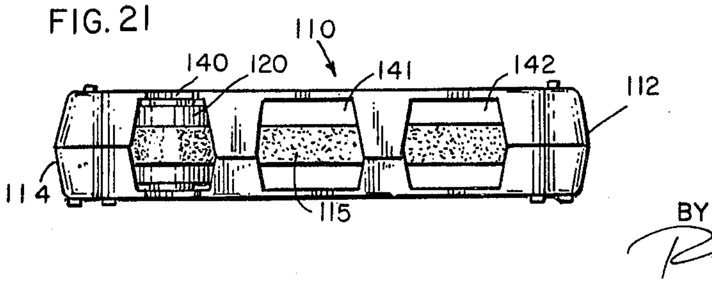
FIG. 21 is an end view of the cartridge, showing in elevation the exposed tape end thereof.

The exemplary endless tape cartridge 110 is illustrated in FIGS. 20 and 21 in perspective and in frontal view, respectively. Its external features correspond to those shown and described in the copending patent application Ser. No. 393,083 for "Magnetic Tape Cartridge," filed Aug. 31, 1964 and now Patent No. 3,350,025 assigned to to assignee hereof. A transverse cavity 113 along the upper rear section is a finger grip region that also signifies correct orientation of the cartridge for insertion in the player. Adjacent shallow side indentations 134, 134 are finger grip regions, as well.

The housing of cartridge 110 is formed in two halves, the lower one containing the control side notches 146 and 131. A web portion 149 overlies the deeper notch 146 to strengthen the cartridge section thereat and prevent dirt entering the cartridge from that region. The inclination of retainer-wall 130 is of the order of 45° from side 114 in the exemplary cartridge, but may well be in the range of about 30° to 60°. The orientation of wall 130 is such as to generate the two force components referred to hereinabove in conjunction with swing-in retention roller 125: one force component firmly pressing the pinch roller (120) against the capstan (72); the other force component pressing the opposite cartridge side (112) stably against rollers 135, 136.

It is noted that the leaf-spring 126 is anchored on side wall 47 at a position (126′) substantially more interior in the player in the direction towards capstan 72 than lies roller 125. Also, spring 126 is substantially parallel to this tunnel side wall (47), preferably with an intermediate kink 126″ and a projecting yoke 126*a* that present roller 125 further into the tunnel 44. The result is a swing-in action of retention roller 125 towards and into the tunnel 44. More importantly, when roller 125 is in play-hold coaction with inwardly inclined retention surface 130 of the cartridge, as shown in FIG. 3, the respective active force components thereby generated remain more stable. The said swing-in arrangement of roller-spring 125, 126 provides a force component on cartridge surface 130 by roller 125 in the direction towards the capstan for this useful result.

An advantageous arrangement and correlation of cylindrical side rollers 135, 136 and retention roller 125 at the tunnel 44, is provided herein. The invention arrangement materially facilitates insertion of the cartridge into and its removal from the play position. It greatly minimizes frictional factors and thus affords smooth cartridge handling with minimal exertion of force. Rollers 135, 136 are mounted on rods 148, 148′ and fit openings 149, 149′ in tunnel side wall 61, see FIGS. 3 and 17. Small end bushings 147, 147′ hold rollers 135, 136 at a proper level for firm rolling engagement with the side wall (112) of the cartridge (110).

A practical orientation for stationary wall rollers 135, 136 is: parallel to the plane of tape play (see FIG. 18); at a level to firmly press against at least the central level of the cartridge; and an operative portion of the side rollers projecting beyond the side tunnel wall (61) into the cartridge receiving tunnel (44). The cartridge side 112 thus does not engage or rub against the player side wall 61, as the projecting wall rollers 135, 136 keep it away therefrom. Reducing the area of contact between rollers 135, 136 and cartridge side 112 provides smoother coaction therebetween, particularly if the cartridge housing is somewhat warped. This is accomplished by inclining side wall 112 inwardly from its central longitudinal region at the juncture of the housing base and cover, and providing a thin flat surface thereat (see FIG. 1).

Figures 22, 23:
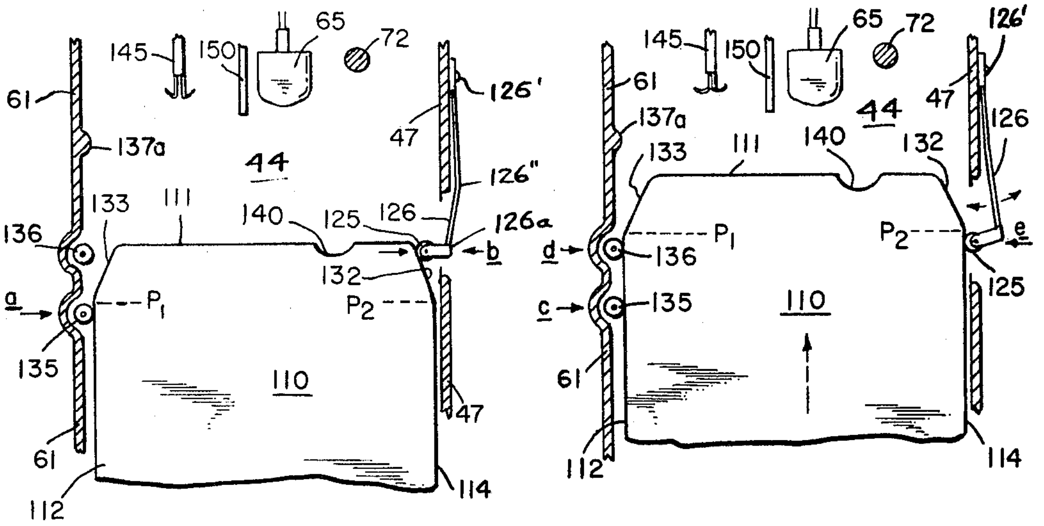
FIGS. 22 and 23 are diagrammatic illustrations of intermediate stages in the insertion operation of a magnetic tape cartridge into the player.

The tough self-lubricating side-wall rollers 135, 136 establish a minimum of rolling friction and requisite handling force for cartridge insertion and removal. The tunnel side of walls 47 and 61 are made a little wider apart than the width of the cartridge (110). This facilitates the initial progress of the cartridge into the tunnel (44), in the phase until the front of the cartridge reaches the into-tunnel projecting retention roller 125. FIG. 22 illustrates this initial phase of cartridge insertion. Side roller 135 easily passes level $P_1$ of the cartridge, where ramp 133 meets the adjacent side 112. This is due to tunnel 44 being somewhat wider than the cartridge, and the presence of a ramp (132) at the corner of the cartridge encountering inwardly projecting roller 125. Side roller 135 is particularly positioned in wall 61 so as to engage the side (112) of the cartridge at a level just below level $P_1$ (in FIG. 22) before roller 125 exerts an appreciable pressure on a cartridge being inserted. For this purpose roller 135 is mounted at a level in tunnel 44 further from the capstan (72) than is the unengaged roller level *b*, by a distance of the order of the longitudinal extent of ramp 132 (see FIG. 22). In effect, such longitudinal separation of rollers 125 and 135 in tunnel 44 is approximately the distance between the indicated level $P_2$ and front edge 111 of the cartridge.

Continued insertion of the cartridge results in its rolling engagement with side roller 135, and the riding of roller 125 along ramp 132. This results in forcing roller 125 to swing in the outwardly direction due to the configuration of ramp 132, and against increasing force exerted by the spring 126, until the ramp 132 passes roller 125 and engages with cartridge side 114, as shown in FIG. 23. The ramp's displacement of roller 125 is relatively gradual so as not to directly encounter it full-force, resulting in easier cartridge insertion against a considerably strong spring (126) pressure. A relatively strong force is needed for the single retention spring (126) so that it firmly and stably seats the cartridge in play position against capstan 72. By projecting roller 125 well into the tunnel normally, as shown in FIG. 22, the significant spring force is exerted by retention roller 125 on retention wall 130 at a location extending interior of the cartridge with respect to its side wall 114 when the cartridge is seated for play (see FIG. 3). To overcome interference to insertion from such desirable normal projection of roller 125 into the tunnel, the ramp (132) on the cartridge corner is provided so as to displace the retention roller 125 gradually, outwardly of the tunnel (44).

The longitudinal position of roller 125 in the tunnel is predetermined with respect to capstan 72 so that it snaps into notch 146 and reposes against an intermediate portion of the inclined retention wall 130 therein with the consideable force requisite to both stably and firmly hold the pinch roller and capstan in tape transport relation, and the opposite cartridge side wall 112 in engagement with side rollers 135, 136, as aforesaid. Roller 135 is positioned in side wall 61 at a level just below that of roller 125 when in its extended position shown in FIG. 23. In this way both rollers 135 and 136 engage cartridge side 112 and hold the cartridge against skewing when roller 125 reaches side 114, as shown in FIG. 23. The longitudinal separation of the axes of side rollers 135, 136 is of the order of the longitudinal length of the ramp 132 of the cartridge intended for the player 30.

When the cartridge is pushed all the way in to snap-in engagement by retention roller 125 against retention wall 130, the pinch roller 120 is held suitably pressed against capstan 72, as seen in FIG. 3. The notch region 146 in the exemplary cartridge is well within the pinch roller half thereof, as seen in FIGS. 3 and 20. This insures minimum displacement of the intended pinch roller position for the fixed capstan (72). Also a fixed pad 137 such as of "nylon" is provided in side wall 61 to project into tunnel 44 at the region to abut cartridge side 112 just below ramp 133 when fully seated, as in FIG. 3, to prevent tilt of the cartridge in its "floating" condition for play. A bump 137*a* cast onto wall 61 may instead be used for this purpose.

What is herein termed the "floating" engagement of the cartridge involves the combined pressure points due to rollers 135, 136 as at *c* and *d* and of roller 125 as at *e*, during insertion. When fully seated such "floating" play mode contains the corresponding pressures of rollers 135, 136 on side 112; that of roller 125 on retention surface 130; the pressure roller 120 on capstan 72 and of the front of side 112 on projection 137. The composite result is a set of well balanced forces that firmly hold the cartridge in the tunnel in play array against the capstan. Further the "floating" system hereof permits ready insertion against a retention spring of considerable hold-in force and against a roller that initially projects substantially into the tunnel so as to firmly engage with a deep-in notch on the cartridge side; as well as ready disengagement thereof.

As briefly described hereinabove the motor control circuit is connected to motor 70 by leads 200. The dual section transducer or head 65 contains pick-up sections 66 and 67 connected by leads 204, 205 to the individual amplifiers 63, 64 that in turn operate loud speakers 68, 69. The amplifiers 63, 64 are energized by battery 73 through leads 206, 207 and common connection 208 to main on-off switch 58. Radio/tape play mode switch 95*a* is similar to over-cartridge switch 95, except it is actuated by cartridge front 111. It is in tape-play contact 160*a* connect to leaf 163*a*. This closes motor control energization input lead 201 with connection 202 to the battery 73, and results in motor 70 rotation at its predetermined speed, as aforesaid. Its capstan 72 transports tape 115 in the fully seated cartridge 110 as shown in FIG. 24.

When the cartridge is withdrawn, as about ⅜" or ½", its shallow forward notch 131 engages roller 125; switch arm 160*a* returns to its normally closed-on-lower-contact 164*a* condition; the motor circuit is deenergized and the motor stops; and battery connection 202 is completed on lead 203 to energize the radio tuner 45. With no tape record signal entering head 65, the radio program signals directly enter amplifiers 63, 64. Towards this end coupling resistors 210 and 211 are used to the amplifiers from common radio output lead 212. Thus both sets of stereo loud speakers 68, 69 play the radio output. Also, the impedance of resistors 210, 211 are made significantly greater than that of the head coils 66, 67 so that negligable signal power loss occurs during their relatively low signal level output during tape play. Conversely the much greater output level of radio unit 45 overcomes the impedance shunting by coils 66, 67. Such connection minimizes switch change to effect the radio and tape modes herein.

The complete player 30 is illustrated in perspective in FIG. 25. Its compactness affords ready mounting in an automobile dashboard, or in other locations with bracket 37 as stated hereinabove. The front bezel 106 is an optional inexpensive decorative element. The battery lead 215 extends from the player as through a channel 109 in a ledge 108 formed in the rear of the player sections 31, 32 (see FIGS. 2, 3). A fuse and holder 216 is in cable 215 that has a terminal lug 217 for battery connection. The multi-speaker cable also extends from inside the player and has a plug 220 for receptical 221 that terminates the speaker system mounted in the vehicle. By placing say two speakers for each channel, one set on each side of the car occupants, stereophonic reproduction of the tape record is experienced, as the signal separation of the taped channels is excellent, as is their tracking hereof.

The player and its component sections has herein been set forth and described on an exemplary basis. It accordingly is to be understood that changes and variations thereof and therein may be made by those skilled in the art without departing from the broader spirit and scope of the invention therein, as set forth in the following claims.

What is claimed is:

1. A magnetic tape player comprising a capstan, a tunnel for the entry of a cartridge containing a reel of magnetic tape and having a front opening to present an exposed portion of the tape to said capstan between a pair of side walls, one side wall being spaced further from the capstan than the other side wall, a pair of longitudinally spaced members adjacent said one side wall of the tunnel for coaction with a longitudinal side of the cartridge, a spring-mounted element arranged at the other tunnel side wall for detent coaction with an inclined recess in the other longitudinal side of the cartridge, said members and said element being located to remain in contact with the cartridge when it is fully seated into the tunnel in play position with its tape juxtaposed against said capstan, the one of said members that is nearer to said capstan being positioned at a longitudinal level in the tunnel that is opposite the position of said element, the said longitudinal side walls of the tunnel being spaced apart little more than the width of the cartridge, each of said members having a portion that projects into said tunnel for coaction with the adjacent side of the cartridge, the spring mounting said element being adapted to bias said element through an opening in said other tunnel side wall to project the element into said tunnel for said coaction with the said inclined recess to receive and hold the cartridge stably in the player tunnel.

2. A magnetic tape player as claimed in claim 1, including a third member secured to said one tunnel side wall located forward of said one member in the direction of the capstan and projecting into the tunnel for coaction with a corresponding more forward portion of the cartridge side to stabilize the positioning of the cartridge longitudinally in its play mode in the player tunnel.

3. A magnetic tape player as claimed in claim 1, in which said pair of longitudinally spaced members are rollers each mounted for rotation on a vertical axis perpendicular to the direction of movement of the cartridge in the tunnel, said rollers being arranged to project from said one side wall into the tunnel and roll against the adjacent longitudinal side wall of the cartridge to facilitate its insertion in and removal from the player tunnel.

References Cited

UNITED STATES PATENTS

| | | | |
|---|---|---|---|
| 2,681,950 | 6/1954 | Owens | 179—100.2 |
| 2,804,508 | 8/1957 | Mastling et al. | 179—100.2 |
| 2,867,389 | 1/1959 | Viets | 179—100.2 XR |
| 2,988,954 | 6/1961 | Kuhnert et al. | 242—55.13 XR |
| 3,004,729 | 10/1961 | Barkhuff | 242—55.13 |
| 3,311,316 | 3/1967 | Williams. | |

BILLY S. TAYLOR, Primary Examiner

U.S. Cl. X.R.

179—100.2; 274—11